United States Patent [19]

Yu

[11] Patent Number: 5,250,888
[45] Date of Patent: Oct. 5, 1993

[54] APPARATUS FOR AND PROCESS OF ROTATING A DISPLAY

[75] Inventor: Hang du Yu, Kyunggi, Rep. of Korea

[73] Assignee: Samsung Electronics Co., Ltd., Rep. of Korea

[21] Appl. No.: 829,774

[22] Filed: Jan. 31, 1992

[30] Foreign Application Priority Data

Jan. 31, 1991 [KR] Rep. of Korea .............. 91-1694

[51] Int. Cl.$^5$ .............................................. G05B 1/04
[52] U.S. Cl. .................................. 318/640; 318/467; 248/919
[58] Field of Search ..................... 318/445–446, 318/460, 466–470, 640, 663; 248/919, 346

[56] References Cited

U.S. PATENT DOCUMENTS

| | | | |
|---|---|---|---|
| 4,591,773 | 5/1986 | Numata | 318/663 |
| 4,703,240 | 10/1987 | Yoshimoto et al. | 318/640 |
| 4,905,315 | 2/1990 | Solari et al. | 318/480 X |
| 4,920,458 | 4/1990 | Jones | 248/919 X |
| 4,933,618 | 6/1990 | Ortlieb | 318/640 |
| 4,964,606 | 10/1990 | Beam et al. | 248/919 X |

*Primary Examiner*—William M. Shoop, Jr.
*Assistant Examiner*—Brian Sircus
*Attorney, Agent, or Firm*—Sughrue, Mion, Zinn, Macpeak & Seas

[57] ABSTRACT

An apparatus for and process of rotating a display adapted to an image display apparatus so that it automatically rotates the screen to face a viewer. For this operation, the apparatus includes a turntable for supporting the display, turntable driving mechanism for rotating the turntable throughout a predetermined angle, a position meter for outputting a voltage corresponding to the rotation angle of the turntable, an optical sensor for detecting the incident direction of a remote control optical signal, and a controller for controlling the turntable driving mechanism by determining the amount and direction of rotation of the turntable in accordance with the outputs of the optical sensor and position meter.

9 Claims, 4 Drawing Sheets

FIG. 3

| D1 | D2 | D3 | D4 | Q | OUTPUT |
|----|----|----|----|----|--------|
| 0 | 0 | 0 | 0 | 11 | S1 |
| 0 | 0 | 0 | 1 | 12 | S2 |
| 0 | 0 | 1 | 0 | 13 | S3 |
| 0 | 0 | 1 | 1 | 14 | S4 |
| 0 | 1 | 0 | 0 | 15 | S5 |
| 0 | 1 | 0 | 1 | 16 | S6 |
| 0 | 1 | 1 | 0 | 17 | S7 |
| 0 | 1 | 1 | 1 | 18 | S8 |
| 1 | 0 | 0 | 0 | 19 | S9 |

FIG. 4

| TURNTABLE ANGLE | POSITION METER OUTPUT |
|-----------------|----------------------|
| −40° | Vcc |
| −30° | 7/8 Vcc |
| −20° | 6/8 Vcc |
| −20° | 5/8 Vcc |
| 0° | 1/2 |
| +10° | 3/8 Vcc |
| +20° | 1/4 |
| +30° | 1/8 Vcc |
| +40° | 0V |

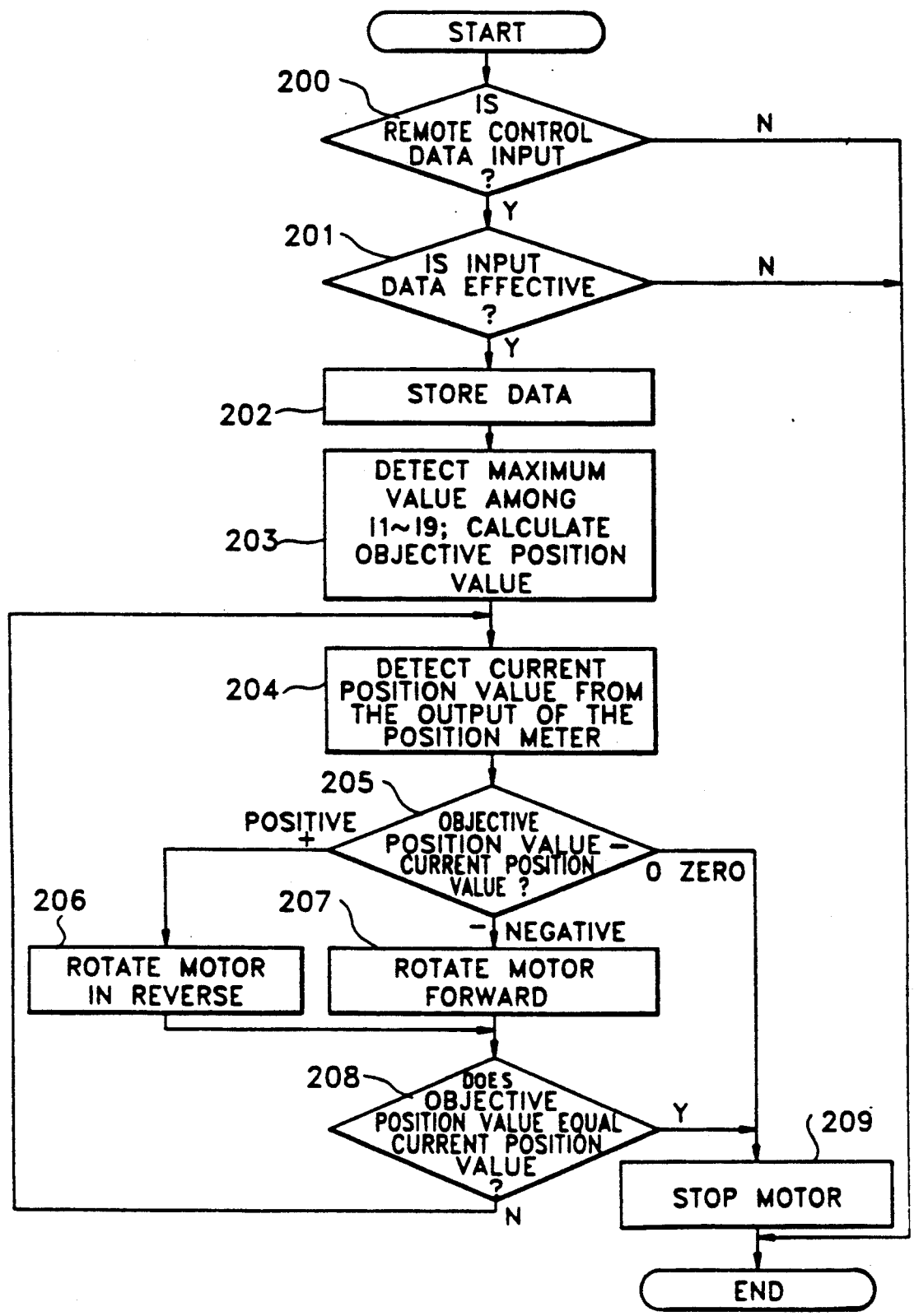

APPARATUS FOR AND PROCESS OF ROTATING A DISPLAY

BACKGROUND OF THE INVENTION

The present invention relates to an image display apparatus, and more particularly to an apparatus for automatically rotating a display such as a monitor in accordance with a viewer's position.

Generally, the orientation of an image display apparatus such as a television or a monitor is fixed by being placed on a table or stand. The display screen of such an image display apparatus is required to be slightly curved due to the characteristics of deflected electron beams used in the display screen. Because of the screen curvature, when a viewer is positioned directly in front of the screen's fixed position can the image on the screen be viewed without distortion. If other viewing positions are desired, the viewer must manually rotate the television in order to see an image on the screen without distortion.

SUMMARY OF THE INVENTION

Therefore, it is an object of the present invention to provide an apparatus for rotating a display which can automatically rotate a display apparatus to make its screen face a viewer by sensing the position of the viewer.

To achieve the above and other objects of the present invention, there is provided an apparatus for rotating a display composed of the following:

a turntable for supporting the display;

turntable driving mechanism for rotating the turntable throughout a predetermined angle;

a position meter for outputting a voltage corresponding to the rotation angle of the turntable;

an optical sensor for detecting the incident direction of a remote control optical signal; and a controller for controlling the turntable driving mechanism by determining the amount and direction of rotation of the turntable in accordance with the outputs of the optical sensor and position meter.

BRIEF DESCRIPTION OF THE DRAWINGS

Other objects and advantages of the present invention will become more apparent from the following description with reference to the accompanying drawings, in which:

FIG. 3 is a table illustrating input logic values of the control terminals of an analog switch in the apparatus for rotating the display of FIG. 1, and their correlation to optical sensor outputs;

FIG. 4 is a table illustrating the outputs of a position meter with respect to the rotation angles of the turntable in the apparatus for rotating the display of FIG. 1; and FIG. 5 is flowchart of a program stored in the microcomputer of the circuit shown in FIG. 1.

DETAILED DESCRIPTION OF THE PREFERRED EMBODIMENT

Figure 1:
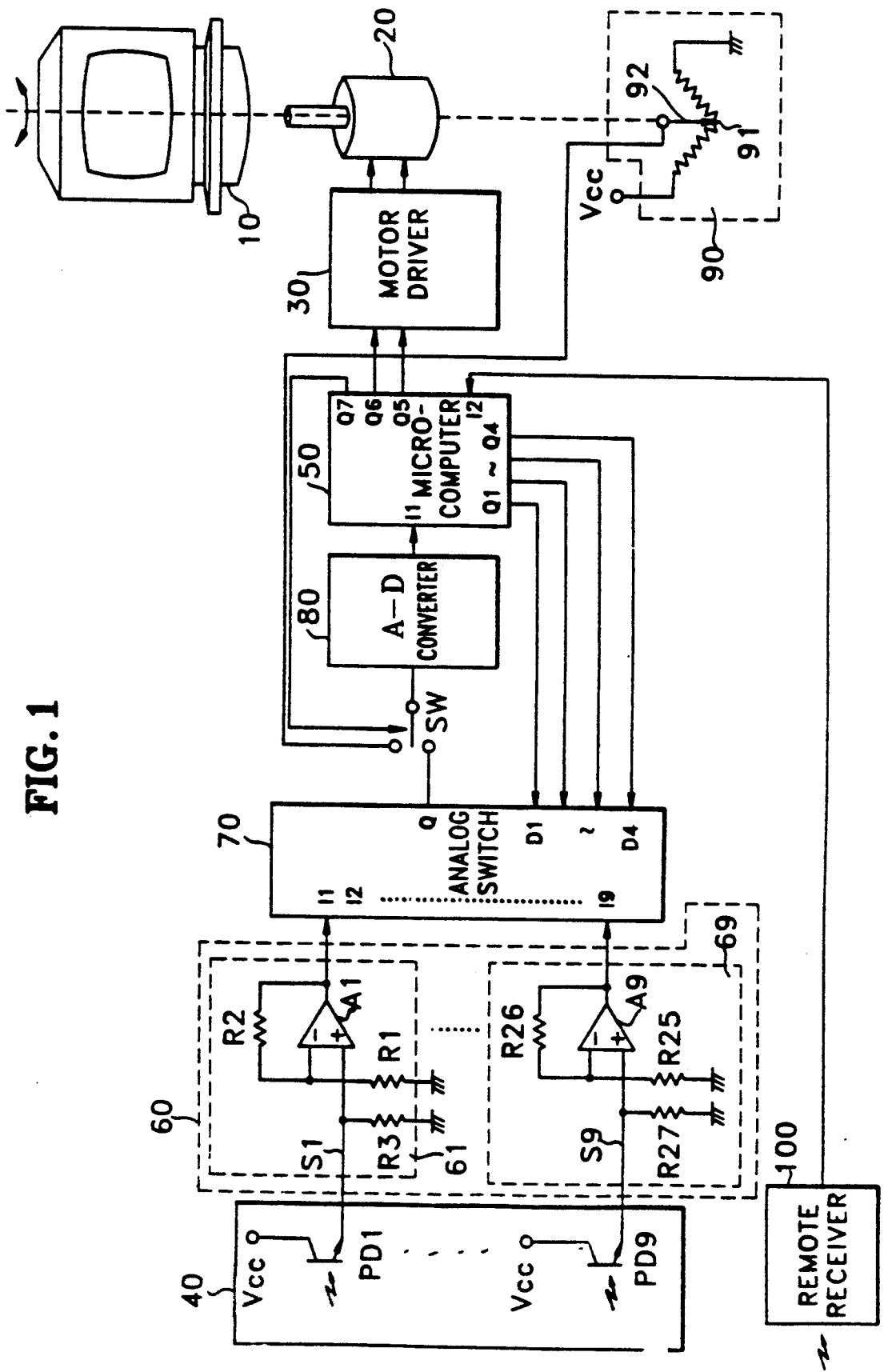
FIG. 1 is a block diagram showing an embodiment of an apparatus for rotating a display according to the present invention.

In FIG. 1, outputs S1–S9 of an optical sensor 40 are input to non-inverting inputs of respective operational amplifiers 61–69 within an amplifying unit 60. The outputs of amplifying unit 60 are connected to the corresponding inputs I1–I9 of an analog switch 70. An output Q of analog switch 70 is connected to a first selective contact point of a control switch SW. A reference contact point of control switch SW is connected to an analog-to-digital converter 80 (hereinafter referred to as "A-D converter"). A control terminal of control switch SW is connected to a seventh output Q7 of a microcomputer 50. The output of A-D converter 80 is connected to first input I1 of microcomputer 50. First through fourth outputs Q1–Q4 of microcomputer 50 are connected to first through fourth control terminals D1–D4 of analog switch 70. The output of a remote receiver 100 is connected to second input I2 of microcomputer 50. A wiper 92 of a position meter 90 is connected to a second selective contact point of control switch SW. First and second inputs of a motor driver 30 are connected to fifth and sixth outputs of Q5 and Q6 of microcomputer 50. First and second inputs of a motor 20 are connected to the first and second outputs of motor driver 30. A turntable 10 has a slot in the center of its bottom, so that the shaft of cylindrical motor 20 can be seated by insertion into the slot. Position meter 90 is fixedly mounted to the axis of motor 20 and a fixed resistor plate 91 electrically connected between a supply power Vcc and ground, thereby generating differently divided voltages in accordance with the rotation of motor 20. Amplifying unit 60 consists of nine non-inverting amplifiers 61–69 each composed of three resistors (R1–R3, R4–R6 . . . , and R25–R27) and a single operational amplifier (A1–A9). An optical sensor 40 includes nine photo-transistors PD1–PD9 whose construction will now be described with reference to FIG. 2.

Figure 2:
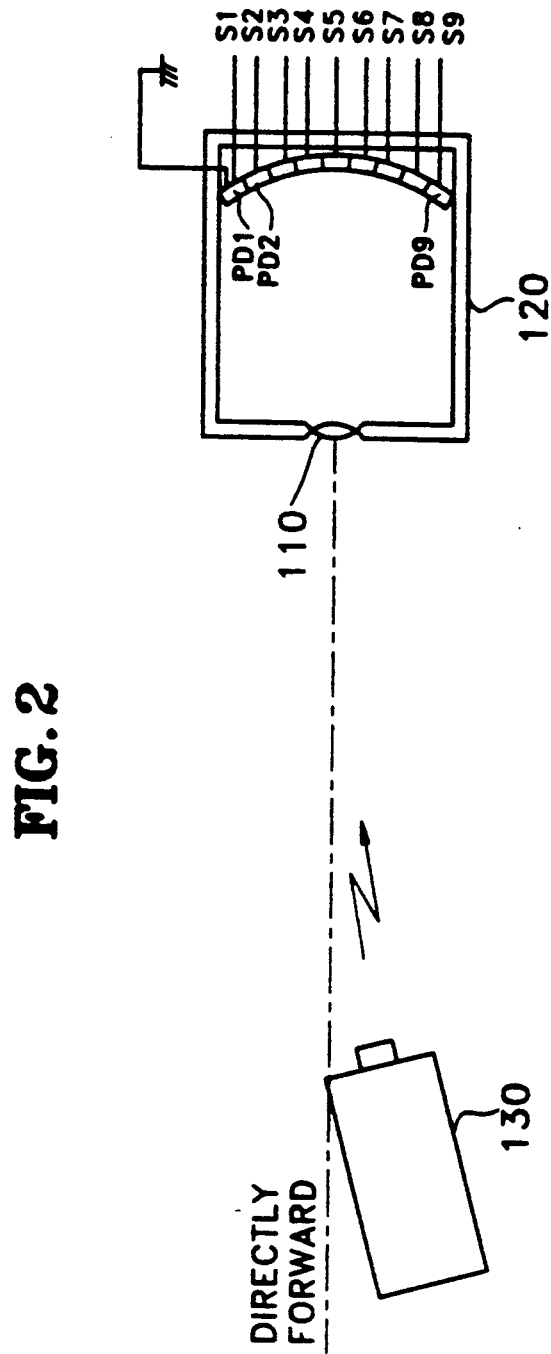
FIG. 2 is a schematic view of an optical sensor included in the apparatus for rotating the display of FIG. 1, and its relative position to a user operating a remote control transmitter.

FIG. 2 is a schematic view of optical sensor 40 of FIG. 1, together with a remote transmitter 130. In FIG. 2, photo-transistors PD1–PD9 are together arranged in the shape of an arc on one interior wall of a housing 120 such that their light receiving portions face the opposite wall of the housing. A focal lens 110 is installed in the center of the opposite wall facing photo-transistors PD1–PD9, and focuses an incident optical signal supplied from remote transmitter 130 to be concentrated on one among the nine photo-transistors PD1–PD9 in accordance with the optical signal's angle of incidence.

FIG. 3 is a table which illustrates the correlation between optical sensor outputs and the input logic values of the control terminals of analog switch 70 of the rotating apparatus shown in FIG. 1. In FIG. 3, reference symbols D1–D4 represent first through fourth control terminals of analog switch 70; Q is an output of analog switch 70; and S1–S9 are the outputs of nine photo-transistors PD1–PD9 in optical sensor 40.

FIG. 4 is an output voltage table of position meter 90 with respect to the rotation angle of turntable 10 shown in the circuit diagram of FIG. 1. Although the rotation angle of turntable 10 is set to intervals of 10 degrees in the output voltage table of FIG. 4, the rotation angle can be sub-divided as required.

FIG. 5 is a flowchart of a program performed by microcomputer 50 in the circuit diagram of FIG. 1.

Now, the operation of the device shown in FIG. 1 will be described with reference to FIGS. 2 through 5.

Microcomputer 50 checks whether or not remote control data is input to second input I2 from remote receiver 100 over a predetermined period of time (step 200). Remote receiver 100 demodulates an optical signal from remote transmitter 130, and supplies the demodulated signal to second input I2 of microcomputer 50.

If remote control data is entered in step 200, microcomputer 50 checks whether or not the entered remote control data is effective (step 201).

If the remote control data is effective in step 201, microcomputer 50 stores the output from optical sensor 40 in its internal RAM (step 202). Hereinafter, the process for supplying the output of optical sensor 40 to microcomputer 50 will now be described. The outputs of nine photo-transistors PD1-PD 9 in optical sensor 40 are supplied to each corresponding non-inverting amplifier 61-69. The nine non-inverting amplifiers 61-69 respectively receive the outputs from nine photo-transistors PD1-PD9 through their non-inverting inputs, perform amplification, and then supply each output to respective inputs I1-I9 of analog switch 70.

In accordance with the logic value of the input selecting data supplied from the first to fourth outputs Q1-Q4 of microcomputer 50 to first through fourth control terminals D1-D4, analog switch 70 sequentially supplies the input signals amplified in amplifying unit 60 to A-D converter 80 via control switch SW. In FIG. 3, output Q of analog switch 70 is shown in accordance with the logic values supplied to its first through fourth control terminals D1-D4. A-D converter 80 digitizes the outputs of photo-transistors PD1-PD9 entered from output Q of analog switch 70, and then supplies the digitized outputs to microcomputer 50.

After executing step 202, microcomputer 50 searches for the maximum value among the outputs of photo-transistors PD1-PD9, thereby detecting the viewer's relative position and calculating an objective position value, i.e., output voltage, of position meter 90 when turntable 10 is rotated toward the viewer's position according to the table shown in FIG. 4 (step 203). By way of seventh output Q7, microcomputer 50 also controls control switch SW, allowing the output from position meter 90 instead of analog switch 70 to be connected to A-D converter 80, thus detecting the current position value from the output of the position meter (step 204).

Then, microcomputer 50 compares the output voltage, i.e., current position value, from position meter 90 supplied to A-D converter 80 with the objective position value obtained in step 204 (step 205).

If the current position value is smaller than the objective position value in step 205, microcomputer 50 supplies a high logic motor control signal via sixth output Q6 and a low logic motor control signal via fifth output Q5 to motor driver 30, thereby allowing motor driver 30 to rotate motor 20 in the reverse direction. At this time, turntable 10 rotates clockwise (step 206).

If the current position value is larger than the objective position value in step 205, microcomputer 50 supplies the high logic motor control signal via fifth output Q5 and the low logic motor control signal via sixth output Q6, thereby allowing motor driver 30 to rotate the motor 20 in a forward direction. At this time, turntable 10 rotates counter-clockwise (step 207). In the case where the control signals via outputs Q5 and Q6 are equal to each other, the motor driver 30 is not activated.

After step 206 or 207, microcomputer 50 checks whether or not the current position value equals the objective position value (step 208). If they differ, the program returns to step 204 and the above procedures are repeated. Conversely, when the values are substantially equal, motor 20 is stopped (step 209), and the rotation is completed.

In the present invention as described above, the viewer's relative position is detected in accordance with the incident direction of a remote control signal, and then, the display is rotated to make the screen face the detected position, thereby providing a clear picture to the viewer at all times.

What is claimed is:

1. An apparatus for rotating a display in response to a received remote control optical signal, the apparatus comprising:
   a turnable for supporting a display;
   driving means for rotating said turntable;
   a position meter for outputting a signal corresponding to a rotation angle of said turntable;
   an optical sensor for detecting an incident direction of the received remote control optical signal; and
   a controller for controlling said turntable driving means by determining an amount and direction of rotation of said turntable in accordance with the outputs of said optical sensor and position meter and causing said driving means to rotate said turntable in the determined direction by the determined amount.

2. An apparatus for rotating a display as recited in claim 1, wherein said controller comprises:
   amplifying means for amplifying output signals from said optical sensor;
   an analog switch for selectively outputting said outputs from said amplifying means in sequence according to control signals;
   a control switch for selectively switching the outputs of said analog switch and said position meter;
   an A-D converter for digitizing the signals input through said control switch; and
   a microcomputer for controlling said turntable driving means in accordance with the input signals from said A-D converter, said microcomputer detecting a transmitting position of said optical signal in accordance with the maximum value among the outputs from said optical sensor, and controls said turntable driving means by comparing the output signal of said position meter, which represents the objective position value, with the current position value of said position meter.

3. An apparatus for rotating a display as recited in claim 1, wherein said turntable driving means comprises a motor for rotating said turntable and a motor driver for driving said motor in accordance with the output from said controller.

4. An apparatus for rotating a display as recited in claim 3, wherein said turntable has a slot in the center of its bottom, thereby allowing a cylindrical axis of said motor to be fixedly inserted thereinto.

5. An apparatus for rotating a display as recited in claim 1, wherein said position meter comprises a fixed resistor plate connected between a supply voltage and ground, and a wiper for sensing the rotation of said turntable driving means.

6. An apparatus for rotating a display as recited in claim 1, wherein said optical sensor comprises a plurality of photo-transistors.

7. An apparatus for rotating a display as recited in claim 6, wherein said plurality of photo-transistors are arranged on one interior wall of the housing of said optical sensor such that their light receiving portions form an arc facing the opposite wall of the housing.

8. A process of rotating a turntable comprising the steps of:

simultaneously receiving a remote control signal in a plurality of different positional locations;

determining that one positional location of the plurality in which the remote control signal is most incident;

determining a position of a turntable;

rotating the turntable until its position matches said one determined positional location.

9. The process of rotating a turntable as recited in claim 8, wherein the turntable supports a visual display screen.

* * * * *